Nov. 13, 1945.   H. J. CRINER   2,388,725
SLICING MACHINE
Filed Feb. 9, 1942   3 Sheets-Sheet 3
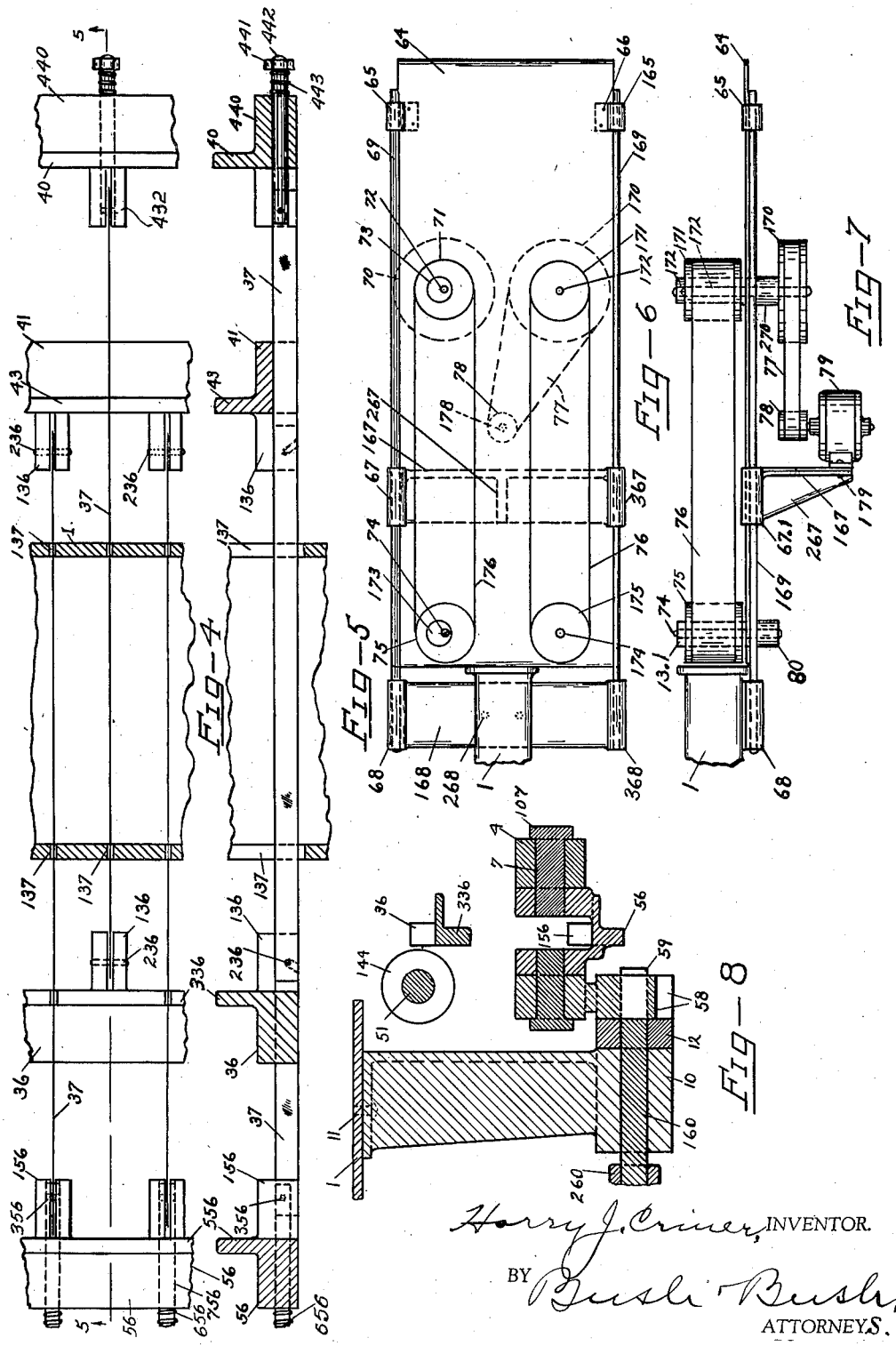

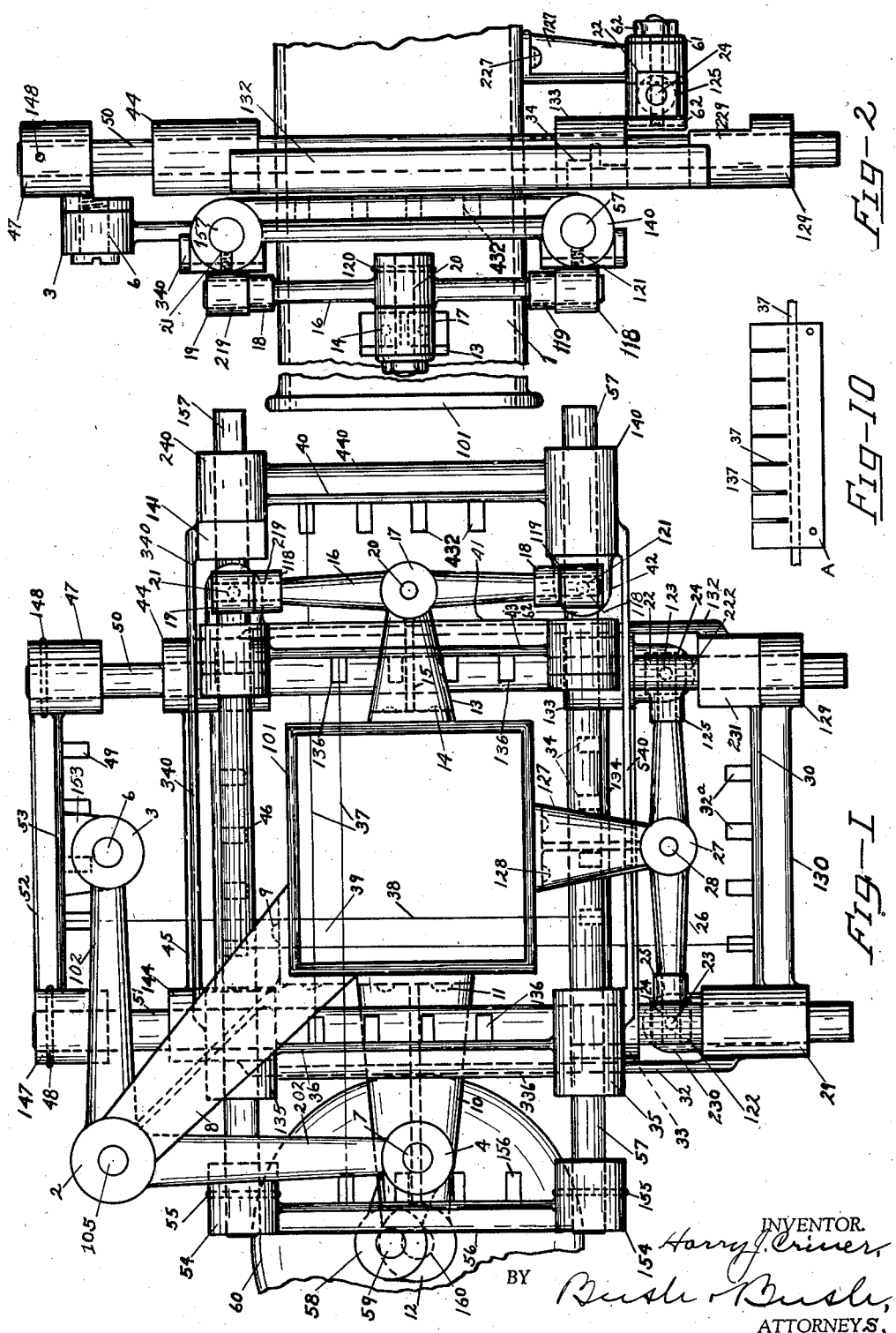

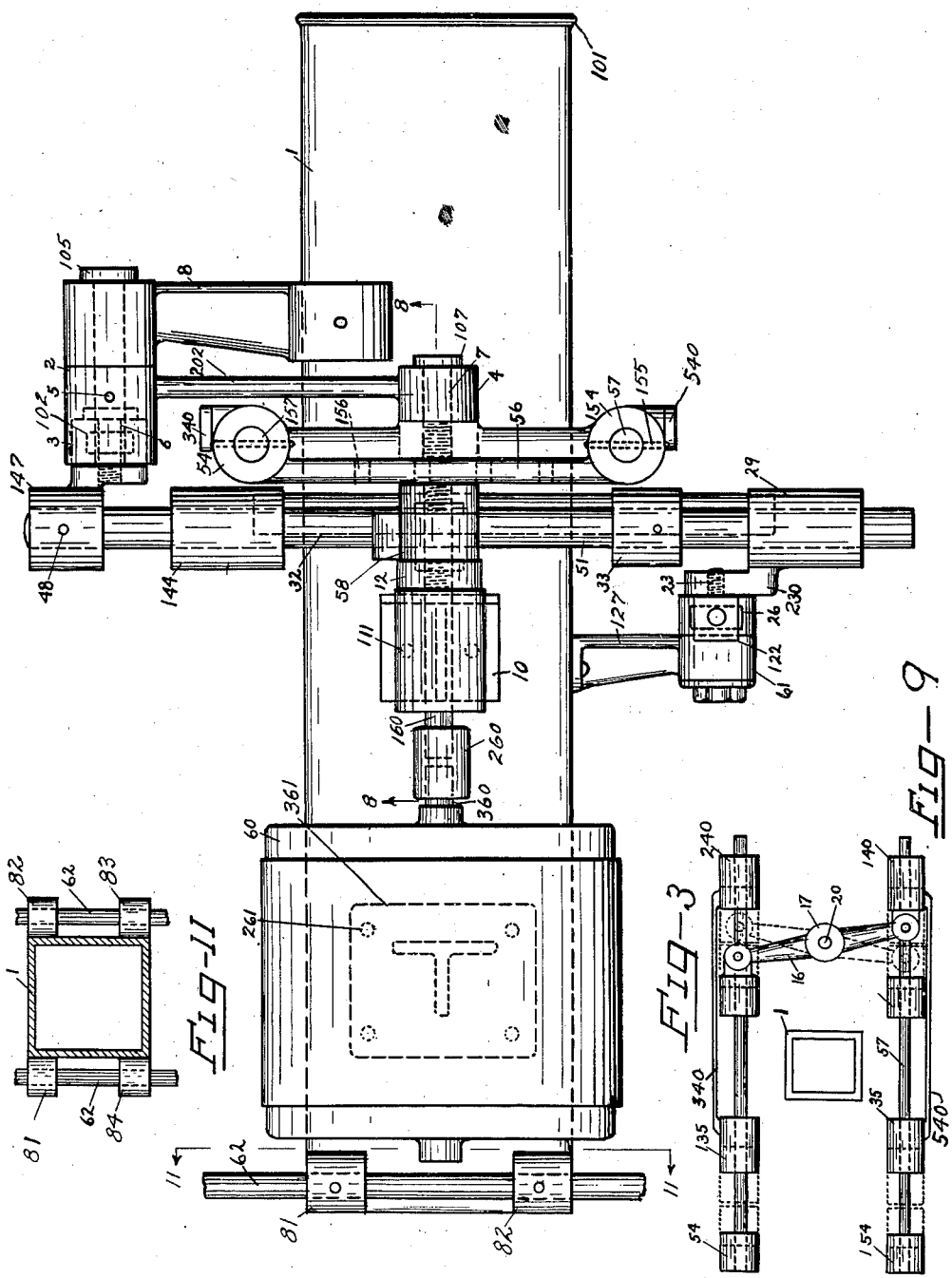

Patented Nov. 13, 1945

2,388,725

UNITED STATES PATENT OFFICE 2,388,725

SLICING MACHINE

Harry J. Criner, Davenport, Iowa, assignor of one-half to A. G. Bush, Davenport, Iowa Application February 9, 1942, Serial No. 430,037

10 Claims. (Cl. 146—78)

My invention relates to slicing machines.

The objects of my invention are to provide a simple, compact, efficient machine for cutting slices of bread, slices of fruits, meats and other articles generally, into cubes of a size suitable for croutons or other specially prepared foods and for other purposes where small cubes of material are desired; to provide such a machine which will take sliced loaves of bread and particularly bread returned to a baker when not sold the first day after baking, and quickly and readily cut the slices into strips and then into cubes or other rectangular forms with a minimum of tearing, crumbling and waste; to provide a simple mechanical movement for simultaneously reciprocating a plurality of pairs of frames arranged in parallel planes but traveling at an angle to each other, in which one member of each pair travels in a direction opposite to the simultaneous travel of the other member of said pair; and in which the frames are supported and guided by their driving mechanism and by each other, to provide such a machine with interchangeable adjustable blade frames whereby differently spaced blades may be utilized and the dimensions and size of the cubes may be varied to suit the requirements of different cases; to provide a machine of the type specified with supporting bars by which it can be securely rested upon a vat, conveyor or other receptacle or support. Other objects will appear from the description.

I accomplish these objects by the means illustrated in the accompanying drawings, in which, Figure 1 is a top or plan view but omitting the base supporting rods to avoid confusion;

Figure 2 is a fractional side elevation taken from the right of Figure 1;

Figure 3 is a side elevation taken from the left of Figure 1;

Figures 4 and 5 are enlarged sectional details showing one manner of mounting the blades in the blade frames;

Figure 6 is a diagrammatic view of a feeding apparatus to assist in carrying the sliced loaves of bread through the cutting blades;

Figure 7 is a detail showing a side view of one of the feed belts, pulleys and driving mechanism therefor;

Figure 8 is a sectional detail on the line 8—8 of Figure 3, omitting block 154 and rod 157;

Figure 9 is a reduced diagrammatic view showing in full lines the lower pair of frames at the outward limits of their travel and in dotted lines the position of the frames at the inward limits of their travel;

Figure 10 is an enlarged detail of one of the interchangeable plates A.

Figure 11 is a sectional view on a reduced scale, the section being taken on line 11—11 of Figure 3.

Similar numerals refer to similar parts throughout the several views.

My apparatus comprises a tube or chute 1 with reenforcing bead 101 at the top thereof, which may be either horizontal or vertical but I prefer to have this chute extend in a vertical direction so that gravity may be utilized either alone or in combination with a mechanical feeder, to feed the bread through the blades. This tube is preferably rectangular with interior large enough to readily permit the passage of a loaf of bread endwise through the tube. Where mechanical feed is desired in addition to the gravity feed, an enlarged extension 64 may be mounted upon the upper end of the tube 1 and supported by an arm 168 carrying sockets 68 and 368 in which the lower ends of rods 69—169 may be inserted, said rods carrying the extension 64 above referred to.

At one end of the tube 1 I provide feet or bosses 81, 82, 83, 84 on opposite sides of the tube 1 which may carry supporting rods 62 removably secured therein and the rods 62 are preferably long enough to span a tub or vat or other receptacle in which it is desired to deposit the cubes of bread or other matter after passing through the cutting blades hereafter described.

I rigidly mount upon the tube 1 a bracket 13 secured to the tube by rivets 14, a bracket 127 secured to the tube by rivets 128 or other suitable means, a bracket 10 secured by rivets 11 and a bracket 8 secured by rivets 9. These brackets are made of sufficient size and strength to support the arms, levers, and other parts which carry and actuate the blade frames.

The blade frames are arranged in pairs which travel in parallel planes. In the upright form of machine these planes are horizontal. The lower pair of frames comprises one frame composed of the cross bar 53 with bosses 47 and 147 united thereto and with a reenforcing rib 52 extending lengthwise thereof, together with the rods 50 and 51 and the crossbar 134 with heads 33 and 133 united thereto. The heads 147 and 47 are secured to the rods by pins 48 and 148. The crossbar 53 has a boss or bearing block 153 formed integral therewith upon which the hub 3 of one arm 102 of a bell-crank lever is pivotally mounted by a pivot bolt 6.

The bell-crank lever comprises a hub 2 with arms 202 and 102 extending at right angles therefrom and pivoted by a pivot bolt 105 to the outer end of the bracket 8. The other frame of the lower pair comprises a crossbar 30 with reenforcing rib 130 to which are united bearing blocks 29 and 129 with sidebars 32 and 132. At the opposite end the sidebars are united to bearing blocks 44 and 144 which carry a crossbar 45 united thereto and the bearing blocks 29—129, 44 and 144 are freely slidable lengthwise upon the rods 50 and 51.

Upon the head 61 of the bracket 127 is pivotally mounted a lever 26 with a hub 27 and the pivot bolt 28. One end 124 of the lever 26 is slidably mounted in a sleeve 25, which sleeve is formed integral with a block 122 and which block is pivotally mounted by a pivot bolt 23 upon an extension 230 of the bearing block 29. The other end 24 of the lever 26 is slidable in a sleeve 125 formed integral with a block 22 which is pivotally united by pivot 123 to an extension 222 of the block 133 which in turn is rigidly united to the rod 50 so that as the rod 50 travels longitudinally in one direction, it will cause the lever 26 to rock upon its pivot 28 and cause the block 29 and the frame united thereto, to travel in the opposite direction.

A motor 60 is mounted upon the tube 1 by having its base 361 secured thereto by bolts 261 or other suitable means. A coupling 260 is mounted upon the upper end of the motor shaft 360 and operatively connects it to the stub shaft 160.

The stub shaft 160 is revolvably mounted in the bracket 10, which forms a support for the head 12 and thus for one end of one of the lower pair of frames. The head 12 may be united to the stub shaft 160 by pressfit, key or other suitable means. One of the upper pair of frames comprises crossbar 56, with blocks or bosses 54 and 154 united thereto and rods 57 and 157 rigidly secured to the blocks 154 and 54 by pins 155 and 55 or other suitable means. It includes also the crossbar 43 with similar heads or blocks united thereto, which heads are rigidly united to the rods 57—157.

The other frame of the upper pair comprises a crossbar 36 with rib 336 and a crossbar 40 with rib 440. The crossbar 36 is provided with bearing blocks 35 and 135 which are slidingly mounted upon the rods 57 and 157 and have lateral extensions or sidebars 340 and 540 which united them to bearing blocks 140 and 240 slidingly mounted upon the other ends of the rods 57 and 157.

As the motor shaft revolves it carries with it the stub shaft 160 and the head 12. As the head 12 revolves, it carries with it the crank pin 59 upon which one end of the link 58 is pivoted. The other end of the link 58 is pivoted to a lug or extension of the crossbar 56, which extension also carries a pivot 7 and the upper end of the pivot 7 has pivoted thereon a hub 4 formed upon one end of the arm 202 of the bell-crank lever. (See Figure 8.)

Thus, as the motor shaft revolves it carries with it the stub shaft 160, and the link 58 thereby transmits a reciprocating motion to the crossbar 56 and the rods 57—157 and one end 19 of the lever 16 which is attached to the rod 157 by the pivot pin 21.

As the motor shaft revolves, the crank 59 and link 58 reciprocate the arm 202 of the bell-crank lever and the arm 102 causes one of the lower frames, including the crossbar 53 to travel simultaneously and for the same distance that the upper frame, including the crossbar 56, travels but in a direction at right angles thereto.

One end of the lever 16 is slidably mounted in a sleeve 118 which is pivotally united to the rod 157 by a pivot 21 and the other end of the lever 16 is slidably mounted in a sleeve 18 pivotally mounted upon an extension 42 of the bearing block 140 by a pivot 121. The sleeves being pivotally mounted, are permitted to rock so as to permit some travel of the lever 16 in the sleeves and the ends of the lever 16 being slidable in the sleeves 18 and 118, permits sliding longitudinal movement of the blocks 140 and 240 on the rods 57 and 157 without friction or bending and makes a very compact form of joint.

When constructed as described, the lower pair of frames are supported indirectly by the tube 1 through the bracket 127 and the hub 3 of the arm 102 of the bell-crank lever and the pivotal connections are made long enough and heavy enough to support and guide the frames. At the same time the weight of the upper pair of frames is supported indirectly by the tube 1 and carried by the lever 16 at one end and the head of the stub shaft 160 which in turn is supported by the bracket 10.

As thus constructed, each of the lower frames will slide upon the rods or side bars which form a part of the other lower frame and each of the upper frames will slide upon the rods or side bars which form a part of the other upper frame, without the necessity for bearings, grooves or other supporting devices directly united to the body or tube 1, although additional supports may be utilized if desired.

Thus each frame of each pair is slidably mounted upon the side bars or the rods which form the side bars of the other frame of that pair. The two frames of a given pair are arranged to travel equal distances and in opposite directions at each stroke of the link 58. It will be noted that one crossbar of each frame is located and travels between the two crossbars of the other frame paired therewith and that the slidable bearing blocks are arranged to help support the rods on which they slide as well as to be supported thereby.

Slicing blades 37 and 38 are mounted in suitable lugs, 136, 156, 432, 34, 49, 32a and 46 formed upon the crossbars of the frames, one end of a blade being secured in the lug 136 by a pivot 236 as shown in Figure 4 and the other end of the same blade being attached to a blade-holder 756 slidably mounted in a suitable bore formed in the lug 156 and the crossbar 56, as shown in detail in Figure 4.

A compression spring 656 is mounted upon the outer end of the slidable blade-holder 756 to provide a spring tension upon the blade. The arrangement of the blade-holder is more clearly shown in detail in Figure 5 where the outer end of a blade-holder is threaded at 442 to carry an adjusting nut 441 and a spiral spring 443 is inserted between the adjusting nut 441 and the crossbar 40. The opposite end of this blade is pivotally united by the pivot 236 to the slotted lug 136 united to the crossbar 36. The inner crossbars of the frames are slotted to permit passage of the blades and suitable slots 137 are formed in the sides of the tube 1. For this purpose the tube itself may be slotted, but I prefer to make the corners of the tube heavy enough for its own support and to provide openings in the sides of the tube with slotted plates A as shown in detail in Figure 10, to permit the passage of the blades.

When so constructed, the interchangeable plates A may be provided with different spacings of the slots 137 to make provision for variation in the size of the cubes cut by the machine, and interchangeable frames may be provided with corresponding variations in the spacing of the blades thereon.

The use of the stub shaft will permit ready removal of the motor, and the fact that the frames are supported by the driving mechanisms will facilitate removal and interchange of the frames.

In slicing bread and other articles, it is obvious that one blade frame will be moving in one direction while the blade frame paired therewith is moving in the opposite direction. Thus, the pull of the blades upon the material being sliced will alternate, one blade pulling in one direction while the blades adjacent thereto pull in the opposite direction.

For bread which is a day or two old and for other articles of similar consistency, this alternating pull of the blades will be sufficient to hold the slices or strips of bread in straight lines of travel but where very soft bread or similar soft material is being cut, it is advisable to mount the upper and lower sets of blades in close proximity so that the material to be cut will reach the lower set of blades before it has passed entirely through the upper set. I accordingly prefer to use very thin, narrow blades not exceeding a quarter of an inch in width which may be either plain or serrated or scalloped as desired.

When half inch slices of bread are being cut with such blades, it is obvious that if the upper and lower sets of blades are mounted close together, the bread will reach the lower set before it has entirely left the upper set of blades.

The blades are arranged to stand parallel to the line of travel of the bread or other objects to be sliced and with the cutting edges extending toward the oncoming bread and the frames are so spaced and arranged that the blades carried by both frames of a pair will stand in a common plane.

The plane of the cutting edges of the lower sets of blades will lie a very short distance below the plane of the bottom of the upper sets of blades.

It is obvious that my apparatus is not limited to cutting bread but it is also usable for cutting sliced fruits, either fresh, preserved, or candied, for cutting meats, vegetables and many other materials such as rubber or plastics.

In Figures 6 and 7 I have shown a form of chute adapted for use with my cutter. In this form, a crossbar 168 is united to the tube 1 by rivets 268 or other suitable means and carries sockets in which supporting rods 68 and 368 are seated. These supporting rods carry a flat plate 64 which may form a support for the bread while moving to the chute on the brackets 65—165, 67 and 367. The plate may be riveted to the brackets or secured by other suitable means. Integral with the brackets 67—367, I form a shelf or table 167 on which an electric motor 79 may be mounted and an intermediate flange or web 267 is formed to support the shelf 167.

Upon the plate 64 is mounted a pair of axles 74—174 carrying pulleys 75—175 revolvably mounted thereon. In the plate 64 a pair of shafts 72—172 are mounted carrying on the outer side of the plate driving wheels 70—170 which are operated by a belt driven by a pulley 78 mounted upon the motor shaft 178 on the outside of the plate.

On the inner side of the plate 64 I mount upon the shafts 72—172 and upon the axles 74—174 respectively, pulleys having a length corresponding approximately to the thickness of a loaf of bread and with feeding bands 76—176 so arranged that when the bread is fed in between the feeding bands at the outer end, the bands will carry it forward or downward to the tube 1. One of the axles and one of the shafts may be mounted upon eccentrics so as to be adjustable laterally to increase or decrease the distance between the two feeding bands and to increase or decrease the pressure upon the loaves of bread being transported toward the tube.

In the construction of my machine the two frames constituting a given pair are carefully balanced and the levers are so proportioned that all the frames travel equal distances and reverse their travel simultaneously. In this way the vibration is reduced to a minimum and the efficiency and durability of the machine greatly enhanced, as well as objectionable vibration of the building being avoided.

I have shown a preferred form of my combination which is illustrative and not exclusive, but it is obvious that many variations in the size, form, proportions, and materials of the various parts of my apparatus may be made and equivalents may be substituted for various parts without departing from the spirit of my invention and I do not limit my claims to the precise forms shown in the drawings.

Numeral 15 in Figure 1 indicates an upwardly projecting rib or flange provided to strengthen and stiffen the bracket 13 and similar ribs or flanges are formed upon the brackets 8, 10 and 127. 17 indicates a rounded head formed integral with the lever 16 which corresponds to the circular end of the bracket 13 so as to form a firm seat for the lever 16. 20 is a pivot pin on which the lever 16 is pivoted at its middle point so as to afford horizontal rotative movement of the lever 16 upon its pivot.

32 is an extended sidebar uniting the heads or blocks 29 and 144. Numeral 41 in Figure 4 indicates the flange of the crossbar 43. Numeral 107 indicates the head of the pivot 7 in Figure 8. Numeral 111 indicates the bolts or rivets securing the bracket 10 to the tube. Numerals 119 and 219 in Figure 1 indicate the bores in the sleeves 18 and 118. Numeral 120 in Figure 2 indicates the key or pin securing the shaft 20 in the head of the lever 16. Numeral 141 in Figure 1 indicates a portion of the head 240 reduced to permit travel of the lever 16. Numeral 148 indicates the key or pin securing the head 47 to the rod 50 in Figure 2. Numeral 161 in Figure 3 indicates a washer on the lower face of the head 61 of the bracket 127. Numeral 227 in Figure 2 indicates the rivets securing the bracket 127 to the tube 1. Numeral 229 indicates the bore in the head 129 to permit sliding movement relative to the rod 50. Numeral 356 in Figure 4 indicates pins to secure the ends of the cutting blades in the lugs formed upon the crossbars.

In Figures 6 and 7, I have shown one form of a feeding device which may be utilized either to assist gravity in feeding the slices of bread to the tube 1 or to carry the bread on a horizontal plate or table to the tube 1. This consists of a crossbar 168 secured to the tube 1 by rivets 268 and carries sleeves 68 and 368 at the ends of the crossbar in which carrier rods 69 and 169 are mounted. A flat plate 64 is secured in place between the rods 69 and 169 and may be held by the sleeves 65 and 165 or any suitable form of attachment.

In the plate 64 pivot shafts 74 and 174 are mounted secured by nuts 73.1 and 80, and form an axle for the pulleys 75 and 175. Similar pulleys 71 and 171 are mounted upon shafts 72 and 172 suitably secured in the bed-plate 64.

The belts 176 and 76 are mounted upon pairs of pulleys lengthwise of the tube, the pairs being spaced apart at a distance corresponding to the width of the slices of bread to be carried to the tube 1.

A bracket 167 having a flange 267 and a sleeve 67.1 formed integral therewith, may be mounted upon the rods 69 and 169 and carry an electric motor 79 secured thereto by the bolts 179. The motor shaft 178 carries a drive pulley 78 which in turn carries a belt 77 which passes over and around a pulley 170 mounted upon the outer end of the shaft 172. As the motor revolves, the belt 76 will act to carry the bread to the tube 1 and the pressure of the bread upon the belt 176 will carry that belt in the same direction, the pulleys 71 and 75 being mounted to turn freely upon their respective shafts.

Eccentrics 73 and 173 may be mounted upon the shafts 72 and 74 whereby the position of the pulleys 71 and 73 may be changed to bring them closer to or farther from the pulleys 171 and 175.

In some of the claims I use the term "support" in referring to frames which support each other in part. The term "support" as so used, is used and intended to be understood in the sense in which it is defined in Webster's New International Dictionary, published in 1928, to-wit: "1. To bear the weight or stress of; to keep from sinking or falling; uphold, sustain; as a pillar supports a structure." and not in the sense of a lateral prop or support nor in the sense of holding down or preventing upward movement of the thing supported.

I claim:

1. A slicing machine comprising a conduit to receive and transmit the material to be cut, reciprocating driving means, a rectangular blade frame including side rods with crossbars united thereto and having one end supported by such driving means, arranged for travel transversely of the conduit, a second blade frame having side and end bars and carrying bearing blocks slidingly mounted upon the side rods of the first frame, a lever support or bracket united to the conduit, a lever centrally pivoted upon the support having one end pivotally united to a crossbar of the first frame and its other end pivotally united to one of the bearing blocks so arranged that when the first frame is driven in either direction, the second frame will be driven in the opposite direction, and sets of spaced blades mounted longitudinally in the frames respectively in alternation.

2. A slicing machine comprising a conduit to receive and transmit the material to be cut, reciprocating driving means, a rectangular blade frame including side rods with crossbars united thereto and having one end supported by such driving means, arranged for travel transversely of the conduit, a second blade frame having side and end bars and carrying bearing blocks slidingly mounted upon the side rods of the first frame, a lever support or bracket united to the conduit, a lever centrally pivoted upon the support having one end pivotally united to a crossbar of the first frame and its other end pivotally united to one of the bearing blocks so arranged that when the first frame is driven in either direction, the second frame will be driven in the opposite direction, and sets of spaced blades mounted longitudinally in the frames respectively in alternation and with all their cutting edges standing approximately in a single plane.

3. A slicing machine as described in claim 1, but having a bell-crank lever pivotally mounted near one corner of the conduit upon a suitable support, one arm of said bell-crank lever being pivotally connected to the first mentioned frame and the other arm of the bell-crank lever being pivotally united to a crossbar of a third blade frame, such third frame comprising two crossbars united by side rods, a fourth blade frame slidably mounted upon the side rods of the third frame and driven in alternation with the third frame by a lever centrally pivoted upon an arm of the conduit opposite the driving-arm of the bell-crank lever, whereby the third and fourth frames will be caused to travel alternately in opposite directions simultaneously with the first and second frames in a parallel plane but at right angles thereto, and sets of blades mounted longitudinally in the third and fourth frames.

4. A slicing machine as described in claim 1, but having a bell-crank lever pivotally mounted near one corner of the conduit upon a suitable support, one arm of said bell-crank lever being pivotally connected to the first mentioned frame and the other arm of the bell-crank lever being pivotally united to a crossbar of a third blade frame such third frame comprising two crossbars united by side rods, a fourth blade frame slidably mounted upon the side rods of the third frame and driven in alternation with the third frame by a lever centrally pivoted upon an arm of the conduit opposite the driving-arm of the bell-crank lever, whereby the third and fourth frames will be caused to travel alternately in opposite directions simultaneously with the first and second frames in a parallel plane but at right angles thereto, and sets of blades mounted longitudinally in the third and fourth frames, the pairs of frames and blades being so constructed and spaced that the strips cut by the blades of the first pair of frames will contact the blades of the second pair of frames before they have entirely cleared the first blades.

5. A slicing machine as described in claim 1, but having a bell-crank lever pivotally mounted near one corner of the conduit upon a suitable support, one arm of said bell-crank lever being pivotally connected to the first mentioned frame and the other arm of the bell-crank lever being pivotally united to a crossbar of a third blade frame such third frame comprising two crossbars united by side rods, a fourth blade frame slidably mounted upon the side rods of the third frame and driven in alternation with the third frame by a lever centrally pivoted upon an arm of the conduit opposite the driving-arm of the bell-crank lever, whereby the third and fourth frames will be caused to travel alternately in opposite directions simultaneously with the first and second frames in a parallel plane but at right angles thereto, and sets of blades mounted longitudinally in the third and fourth frames, the pairs of frames and blades being so constructed and spaced that the strips cut by the blades of the first pair of frames will contact the blades of the second pair of frames before they have entirely cleared the first blades, the first pair of frames being supported by the driving means and a lever opposite thereto, and the second pair by the attached arm of the bell-crank lever and the lever opposite thereto as described.

6. A mechanical movement comprising a support, a prime mover mounted thereon to drive a shaft coupled thereto and bearing a crank, a link having one end pivoted upon the crank and its opposite end pivotally connected to a traveling frame having side rods united thereto, a second traveling frame slidably mounted upon the rods of the first frame, a lever centrally pivoted upon the support having one end pivotally united to the first mentioned frame and its other end pivotally united to the second frame, so arranged that rotation of the crank shaft will cause the link and the first mentioned frame to travel in one direction and the second frame to travel simultaneously in the opposite direction, the frames being supported and guided by the shaft head and link at one end and by the lever described, at the other end.

7. A mechanical movement as described in claim 6, in combination with a bell-crank lever pivotally secured to the support, one arm of said lever being pivoted to the first mentioned frame and its other arm being pivoted to and supporting one end of a third frame similar to the first mentioned frame, a fourth frame having bearing blocks slidably mounted upon the side rods of the third frame, and a lever centrally pivoted upon the support having one end pivoted to a side rod of the third frame and the other end pivoted to one of the bearing blocks of the fourth frame and all so arranged that rotation of the drive shaft will cause all the frames to travel reciprocatingly and longitudinally in parallel planes and with the third and fourth frames traveling at a right angle to the first and second frames.

8. In a slicing machine having a tubular body, the combination with a blade frame having a pair of side rods with a crossbar rigidly united to said side rods at one end thereof and another crossbar rigidly united to the side rods and spaced from the other end thereof, a plurality of cutting blades mounted upon the crossbars, a second blade frame having side bars united by crossbars with a plurality of cutting blades mounted upon the crossbars and with bearing blocks united to the second frame at the corners thereof and slidably mounted upon and embracing the side rods of the first frame, the crossbars of the second frame being arranged in alternation with the crossbars of the first frame and said frames being arranged to travel in a single predetermined plane, one of the crossbars of the second frame being mounted upon the side rods of the first frame between the crossbars of the first frame, and one of the crossbars of the second frame being mounted between the intermediate crossbar of the first frame and the ends of the side rods nearest thereto, and means for driving the frames reciprocatingly in opposite directions.

9. A combination as described in claim 8, the driving means being also constructed and arranged to carry and support the frames as well as to drive them.

10. In a cubing machine, the combination with blade frames and blades constructed and arranged as described in claim 8, the blades of each frame being arranged to alternate with the blades of the other frame and the inner crossbars of each frame being slotted to permit travel of the blades of the other frame therein whereby the cutting blades may all be held with their cutting edges traveling in a single predetermined plane.

HARRY J. CRINER.